United States Patent
Keatch et al.

(10) Patent No.: US 8,381,811 B2
(45) Date of Patent: Feb. 26, 2013

(54) METHOD OF ENHANCING ADSORPTION OF AN INHIBITOR ONTO A WELLBORE REGION

(75) Inventors: Richard Keatch, Coull (GB); Hua Guan, Aberdeen (GB)

(73) Assignees: M-I SWACO Norge AS, Stavanger (NO); Oilfield Mineral Solutions Limited, Edinburgh, Scotland (GB)

( * ) Notice: Subject to any disclaimer, the term of this patent is extended or adjusted under 35 U.S.C. 154(b) by 274 days.

(21) Appl. No.: 12/682,950

(22) PCT Filed: Oct. 15, 2008

(86) PCT No.: PCT/IB2008/002728
§ 371 (c)(1),
(2), (4) Date: Oct. 13, 2010

(87) PCT Pub. No.: WO2009/050561
PCT Pub. Date: Apr. 23, 2009

(65) Prior Publication Data
US 2011/0017460 A1     Jan. 27, 2011

Related U.S. Application Data

(60) Provisional application No. 60/980,040, filed on Oct. 15, 2007, provisional application No. 61/012,292, filed on Dec. 7, 2007.

(51) Int. Cl.
*E21B 43/00*     (2006.01)
*E21B 47/00*     (2012.01)
*C09K 8/528*     (2006.01)

(52) U.S. Cl. ............... 166/250.01; 166/263; 166/279; 166/307; 166/310; 507/244; 507/247; 507/277

(58) Field of Classification Search ............ None
See application file for complete search history.

(56) References Cited

U.S. PATENT DOCUMENTS
3,341,453 A    9/1967   Ralston
(Continued)

FOREIGN PATENT DOCUMENTS
EP    0 459 171 A1    12/1991
EP    0 781 729 A1    7/1997

OTHER PUBLICATIONS
International Search Report issued in PCT/IB2008/002728, mailed on Apr. 15, 2009, 4 pages.
(Continued)

*Primary Examiner* — George Suchfield
(74) *Attorney, Agent, or Firm* — Osha • Liang LLP

(57) ABSTRACT

The instant disclosure is directed to a method of enhancing adsorption of a salt inhibitor onto a wellbore region, wherein the method comprises preconditioning the wellbore region, emplacing the salt inhibitor into the wellbore region, and shutting in the wellbore region for a period of time to at least initiate adsorption of the salt inhibitor onto the wellbore region. The salt inhibitor comprises an at least partially water soluble compound comprising a Group 3 to Group 15 metal and/or an at least partially water soluble compound having any one of the formulae:

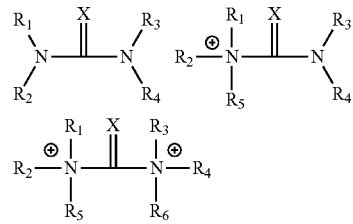

wherein X is O or S; and
$R_1, R_2, R_3, R_4$, and when present, $R_5$ and/or $R_6$ each independently comprise an organic or an inorganic functional group.

9 Claims, 1 Drawing Sheet

U.S. PATENT DOCUMENTS

| | | | |
|---|---|---|---|
| 3,367,416 A * | 2/1968 | Ralston et al. | 507/244 |
| 3,378,489 A * | 4/1968 | Lasater | 507/211 |
| 3,654,993 A | 4/1972 | Smith et al. | |
| 4,357,248 A * | 11/1982 | Berkshire et al. | 507/236 |
| 4,894,169 A * | 1/1990 | Delitsky | 210/698 |
| 5,141,655 A * | 8/1992 | Hen | 507/224 |
| 5,211,237 A | 5/1993 | Faircloth et al. | |
| 5,346,010 A * | 9/1994 | Adams et al. | 166/279 |
| 5,399,270 A * | 3/1995 | Hen | 507/224 |
| 5,604,185 A * | 2/1997 | Hen | 507/119 |
| 5,840,658 A * | 11/1998 | Rosario et al. | 504/348 |

OTHER PUBLICATIONS

Written Opinion issued in PCT/IB2008/002728, mailed on Apr. 15, 2009, 8 pages.

\* cited by examiner

METHOD OF ENHANCING ADSORPTION OF AN INHIBITOR ONTO A WELLBORE REGION

BACKGROUND OF INVENTION

1. Field of the Invention

Embodiments disclosed herein relate generally to methods of inhibiting the deposition and/or crystallization of salt. More specifically, embodiments disclosed herein related to inhibiting the deposition or crystallization of particular sodium chloride salts from brine solutions. Other embodiments disclosed herein relate to methods of enhancing the adsorption and retention of the salt inhibitors, in particular salt inhibitors containing urea and urea analogues, for prolonging the lifetime following a salt inhibitor squeeze treatment.

2. Background Art

Aqueous streams comprising salt are produced and/or treated in a number of industrial processes. Such aqueous streams are often referred to as brine, which are solutions essentially saturated with various salts. Brines commonly include sodium chloride and chlorides of potassium, calcium, and magnesium, along with smaller quantities of salts comprising barium, strontium, iron and lead, all of which are collectively referred to herein merely as salt.

Oil reservoirs often contain high salinity brines in the form of connate waters contained within porous rock formations. These brines are produced along with hydrocarbon liquids and gasses. Such brines may cause production problems when they precipitate solid salt materials that can block pores and accumulate in and on pipes and other production equipment. The relative amounts of the salts vary with the mineralogy of the formation rocks that the connate waters have contacted. These brines may also be saturated and/or supersaturated at temperatures above surface temperatures. As brines are brought to the surface, the cooling of these brines and/or the evaporation of water from these brines as a result of oilfield production operations can cause the dissolved salts to crystallize from solution and deposit as solids. The precipitation of salts from these aqueous streams significantly reduces production of hydrocarbons to the point where remedial action is required, usually involving the re-dissolution of salt using fresh water or low salinity brine. Remedial actions thus require production operations to be limited or even to stop, and often need to be conducted at regular intervals, usually at relatively short regular intervals on the order of days or even hours depending on the location of the well and/or other variables.

In typical oil field applications, the concentrated brines in underground strata are usually saturated solutions at elevated temperatures, i.e. in the neighborhood of 90 to 300 degrees Fahrenheit. The temperature of the brine is reduced as it moves toward the earth's surface in the petroleum recovery process. As the temperature falls, the dissolved salts of the brine tend to come out of solution, usually in the form of crystals on the inner surface of the well bore and associated piping, pumps, rods, and the like. It is not unusual in certain geographic areas for salt deposits to interfere with pump operations or to completely block the flow of oil and brine within a relatively short time, which may lead to a given well becoming an economic failure due to the high cost of "down time" necessary for cleaning and removing the solid deposits. Sodium chloride is the most common of the products which deposit from brines. In addition to oil field applications, brines are also used as heat transfer mediums, in geothermal wells, and numerous other uses. Regardless of the use, when brines saturated at a particular temperature subsequently cool, salt precipitation occurs.

Accordingly, the inhibition of salt from aqueous streams, especially from brine solutions encountered during oil and gas production, presents a formidable challenge, and a continuing need exists for a salt inhibitor which is effective at inhibiting salt formation at relatively low concentrations in the aqueous stream.

SUMMARY OF INVENTION

In an aspect of the present invention, methods of enhancing the adsorption of a salt inhibitor onto a wellbore region are disclosed. The method comprises preconditioning the wellbore region, emplacing a salt inhibitor into the wellbore region, wherein the salt inhibitor is selected from:

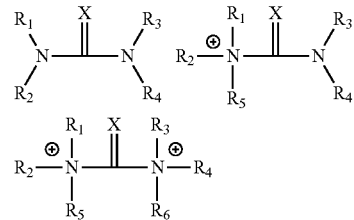

and mixtures of these wherein X is selected from the group consisting of oxygen and sulfur, and $R_1$, $R_2$, $R_3$, $R_4$, and when present, $R_5$ and/or $R_6$ each independently comprise a functional group selected from the group consisting of:

hydrogen, an alkyl chain comprising 1 to 20 carbon atoms, oxygen, sulfur, phosphorous, silicon, selenium, and combinations thereof, and shutting in the well for a period of time sufficient to initiate adsorption of the salt inhibitor onto the wellbore region.

These and other features, aspects and advantages of the present invention will become better understood with reference to the following drawings, description and claims.

In another aspect, methods in accordance with embodiments of the present disclosure include emplacing a brine including a salt inhibitor within a wellbore region in a well; flowing a production of the well back to the surface; and monitoring a salt inhibitor residue from the well.

DETAILED DESCRIPTION

Figure 1:
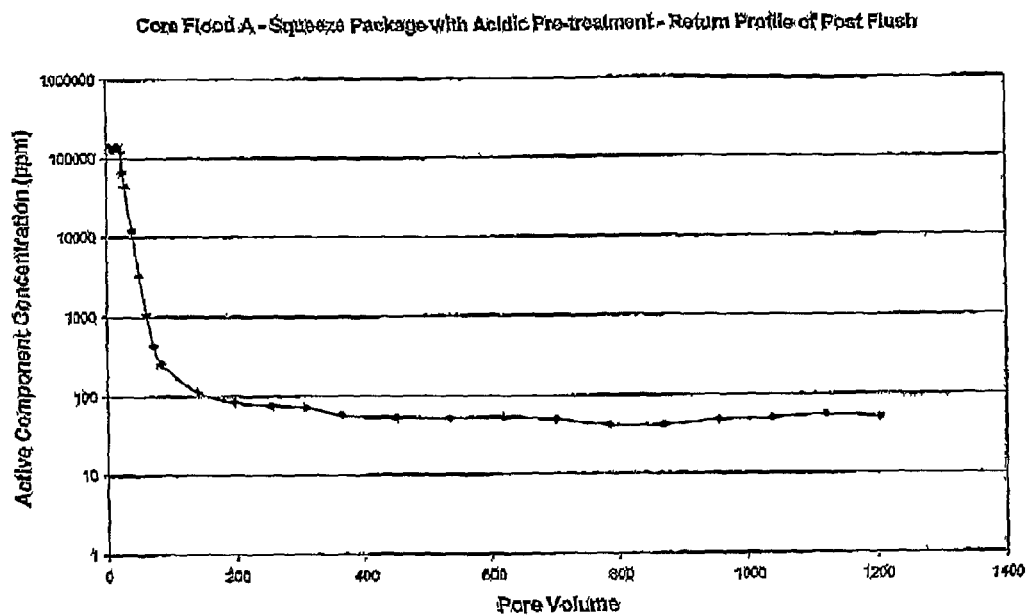
FIG. 1 is a graphical representation of salt inhibitor return profiles from laboratory core flood using acidic pre-flushed squeeze package.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides the use of novel and non-obvious chemicals and combination of chemicals that provide salt crystallization inhibition at low concentrations. The salt inhibitors of the instant disclosure are effective at inhibiting at least some salt precipitation from saturated solutions at concentrations below about 200 ppm, and therefore represent improvements in the art in terms of chemical usage, cost and extended life of squeeze treatments and other types of treatments known in the art. Further, the low concentration salt inhibitors of the present invention enhance the squeeze lifetime by boosting the adsorption and retention of salt inhibitor using favorable pre-flush solutions during a squeeze treatment.

Definitions

The new notation numbering scheme for the Periodic Table Groups is used herein as set out in CHEMICAL AND ENGINEERING NEWS, 63(5), 27 (1985).

As used herein, concentrations may be expressed as ppm (parts per million) and/or by a percentage of the material in the total composition. Unless otherwise stated, all percents express a weight percent (wt %), based on the amount of the material or component at issue in the total composition.

For brevity, upper and lower limitations on physical properties and process conditions may be expressed as ranges. However, it is to be understood that such ranges may comprise any combination of those upper and lower limits recited in any combination herein for a particular component, compound, composition, and/or process. While embodiments may be expressed as comprising a particular limitation, it is to be understood for use herein that such compositions may also consist of and/or consist essentially of the same limitations referred to herein as comprising a particular limitation.

Included within the term "hydrocarbyl" are $C_{1-20}$ straight, branched and cyclic alkyl radicals, $C_{6-20}$ aromatic radicals, $C_{7-20}$ alkyl-substituted aromatic radicals, $C_{7-20}$ aryl-substituted alkyl radicals, halogenated radicals, various hydrocarbyl substituents, and the like. In addition two or more such radicals may together form a fused ring system, including partially or fully hydrogenated fused ring systems, or they may form a metallocycle with a metal. Suitable hydrocarbyl-substituted radicals include mono-, di- and tri-substituted functional groups, also referred to herein as radicals, comprising a Group 14 element, wherein each of the hydrocarbyl groups contains from 1 to 20 carbon atoms. Examples of the various hydrocarbyl substituents include substituents comprising Group 15 and/or Group 16 heteroatoms. Examples include amines, phosphines, ethers, thioethers and/or derivatives thereof, e.g. amides, phosphides, per-ethers and/or thio-ether groups.

Other functional groups suitable for use as substituents include organic and inorganic radicals, wherein each of the functional groups comprises hydrogen, and atoms from Groups 13, 14, 15, 16, and/or 17, preferably 1 to 20 carbon atoms, oxygen, sulfur, phosphorous, silicon, selenium, or a combination thereof. In addition, functional groups may include one or more functional group substituted with one or more additional functional groups. Examples of functional group radicals include: hydrogen, hydroxyl, alkyl, alkyloxy, alkenyloxy, aryl, aryloxy, aralkyl, aralkyloxy, alkaryl, arylalkenyl, cycloalkyl, cycloalkyloxy, aliphatic, hydroxyl, alkanol, alkanolamine, oxy, acetyl, acetamido, acetoacetyl, acetonyl, acetonylidene, acrylyl, alanyl, allophanoyl, anisyl, benzamido, butryl, carbonyl, carboxy, carbazoyl, caproyl, capryl, caprylrl, carbamido, carbamoyl, carbamyl, carbazoyl, chromyl, cinnamoyl, crotoxyl, cyanato, decanoly, disiloxanoxy, epoxy, formamido, formyl, furyl, furfuryl, furfurylidene, glutaryl, glycinamido, glycolyl, glycyl, glyocylyl, heptadecanoyl, heptanolyl, hydroperoxy, hydroxamino, hydroxylamido, hydrazido/hydrazide, hydroxy, iodoso, isoccyanato, isonitroso, keto, lactyl, methacrylyl, malonyl, nitroamino, nitro, nitrosamino, nitrosimino, nitrosyllnitroso, nitrilo, oxamido, peroxy, phosphinyl, phosphide/phosphido, phosphite/phosphito, phospho, phosphono, phosphoryl, seleninyl, selenonyl, siloxy, succinamyl, sulfamino, sulfamyl, sulfeno, thiocarboxy, toluoyl, ureido, valeryl radicals, acetimido, amidino, amido, amino, aniline, anilino, arsino, azido, azino, azo, azoxy, benzylidine, benzidyne, biphenyl), butylene, iso-butylene, sec-butylene, tert-butylene, cyano, cyanamido, diazo, diazoamino, ethylene, disilanyl, glycidyl, guanidino, guanyl, heptanamido, hydrazino, hydrazo, hypophosphito, imido, isobutylidene, isopropylidene, silyl, silylene, methylene, mercapto, methylene, ethylene, naphthal, napthobenzyl, naphthyl, naphthylidene, propylene, propylidene, pryidyl, pyrryl, phenethyl, phenylene, pyridino, sulfinyl, sulfo, sulfonyl, tetramethylene, thenyl, thienyl, thiobenzyl, thiocarbamyl, thiocarbonyl, thiocyanato, thionyl, thiuram, toluidino, tolyl, a-tolyl, tolylene, a-tolylene, tosyl, triazano, ethenyl(vinyl), selenyl, trihydrocarbylamino, trihaloamino, trihydrocarbyl phosphite, trihalophosphine, trimethylene, trityl, vinylidene, xenyl, xylidino, xylyl, xylylene, dienes, and combinations thereof.

For purposes herein, a material which inhibits salt precipitation may also be referred to as a salt inhibitor. As used herein, "salt inhibitor" refers to a material, which when present in a solution that contains salt at a first temperature (e.g. above 25° C.), prevents at least some of the salt from precipitating from the solution when the solution is cooled to a second temperature (e.g., less than or equal to about 25° C.), relative to an identical solution under identical conditions which does not include the salt inhibitor.

As used herein, "nucleation inhibitor" means an agent or a combination of agents that are efficient at blocking crystalline growth sites such that the initial nucleation of the crystals is inhibited. Nucleation inhibitors are extremely useful in preventing the type of salt precipitation problems experienced in oilfield operations.

In an embodiment, the salt inhibitor of the instant disclosure includes an at least partially water soluble compound comprising a Group 3, 4, 5, 6, 7, 8, 9, 10, 11, 12, 13, 14, or 15 metal. Preferably, the salt inhibitor comprises a Group 3-15 metal, more preferably a Group 8 to 14 metal, more preferably a Group 12, 13 and/or 14 metal. In a preferred embodiment, the salt inhibitor comprises a salt of the formula $M_xA_y$, wherein M is a metal selected from the group consisting of Groups 3-15 of the periodic table, preferably a Group 8 to 14 metal, more preferably a Group 12, 13 and/or 14 metal, wherein A is an anionic species, and x and y are integer values which depend on the valence of M and of A such that the overall charge of the salt is neutral. The salt may further comprise waters of hydration, conjugates, cations and/or anions, and the like. For example, the salt inhibitor may comprise a salt of the formula $M_xA_y*z(H_2O)$, wherein M, x, A, and y are defined as above, and wherein z represents the number of waters of hydration which are associated with the particular salt inhibitor.

Examples of suitable anionic species "A" for use herein include halides (e.g., chloride, bromide, iodide, fluoride), acetate, citrate, lactate, glycolate, phosphate, phosphite, nitrate, nitrite, sulfate, alkylsulfate, sulfite, bisulfate, thiosulfate, thiosulfate, carbonate, ascorbate, bicarbonate, percarbonate, borate, perborate, benzoate, formate, malate, tartrate, salicylate, and combination thereof.

In an embodiment, the salt inhibitor comprises a Group 12 metal, more preferably a Group 12 metal salt, with a Group 12 metal halide being still more preferred. In a preferred embodiment, the salt inhibitor comprises cadmium (Cd), more preferably a cadmium salt, with cadmium chloride, cadmium fluoride, cadmium bromide, cadmium iodide, or a combination thereof being still more preferred.

In an embodiment, the salt inhibitor comprises a Group 14 metal, more preferably a Group 14 metal salt, with a Group 14 metal nitrate being still more preferred. In a preferred embodiment, the salt inhibitor comprises lead (Pb), more preferably a lead salt, with lead nitrate, lead nitrite, or a combination thereof being still more preferred.

In another embodiment, the salt inhibitor comprises a Group 3 to 15 metal in combination with a mono dentate, bidentate, and/or tridentate ligand. Examples include various chelating agents such as nitrilotriacetic acid (NTA), iminodiacetic acid (IDA), ethylene diamine tetraacetic acid (EDTA), diethylenetriamine pentaacetic acid (DTPA), dimercaprol, porphine, ethylenediamine, and/or derivatives and/or salts thereof, other chelating agents as described herein, and the like. In a preferred embodiment, the salt inhibitor comprises a Group 12-14 metal in combination with a chelating agent, more preferably cadmium and/or lead in combination with a chelating agent, more preferably cadmium and/or lead in combination with NTA, EDTA, DTPA, or a combination thereof.

In another embodiment, the salt inhibitor comprises an at least partially water soluble compound having any one of the formulae:

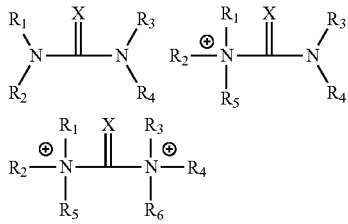

wherein X is oxygen "O" or sulfur "S"; and $R_1$, $R_2$, $R_3$, $R_4$, and when present, $R_5$ and/or $R_6$ each independently comprise an organic or an inorganic functional group or a functional group substituted with one or more functional groups, wherein each of the functional groups comprises hydrogen, 1 to 20 carbon atoms, oxygen, nitrogen, sulfur, phosphorous, silicon, selenium, and/or a combination thereof.

In an embodiment, the salt inhibitor is not a partial salt of the phosphoric acid ester of an oxyalklyated urea wherein said oxyalkylated urea was prepared by reacting from two to about twenty moles of alkylene oxide per mole of urea. Also, in an embodiment, when the salt inhibitor is urea (X═O, $R_1$, $R_2$, $R_3$, and $R_4$═H), the salt inhibitor is present in the aqueous stream at less than about 200 ppm, preferably less than about 150 ppm, preferably less than about 100 ppm, preferably less than about 90 ppm, preferably less than about 80 ppm, preferably less than about 70 ppm, preferably less than about 60 ppm, preferably less than about 50 ppm, preferably less than about 40 ppm, preferably less than about 30 ppm, preferably less than about 20 ppm, preferably less than about 10 ppm, preferably less than about 5 ppm, with less than about 1 ppm being more preferred.

Each of $R_1$, $R_2$, $R_3$, $R_4$, and when present, $R_5$ and/or $R_4$ may independently comprise a functional group, including organic and/or inorganic radicals, wherein each of the functional groups may comprise hydrogen, and atoms from Groups 13, 14, 15, 16, and 17, preferably 1 to 20 carbon atoms, oxygen, sulfur, phosphorous, silicon, selenium, or a combination thereof. In addition, each of $R_1$, $R_2$, $R_3$, $R_4$, and when present, $R_5$ and/or $R_6$ may independently comprise a functional group substituted with one or more additional functional group radicals. Examples of functional group radicals include: hydrogen, hydroxyl, alkyl, alkyloxy, alkenyloxy, aryl, aryloxy, aralkyl, aralkyloxy, alkaryl, arylalkenyl, cycloalkyl, cycloalkyloxy, aliphatic, hydroxyl, alkanol, alkanolamine, oxy, acetyl, acetamido, acetoacetyl, acetonyl, acetonylidene, acrylyl, alanyl, allophanoyl, anisyl, benzamido, butryl, carbonyl, carboxy, carbazoyl, caproyl, capryl, caprylrl, carbamido, carbamoyl, carbamyl, carbazoyl, chromyl, cinnamoyl, crotoxyl, cyanato, decanoly, disiloxanoxy, epoxy, formamido, formyl, furyl, furfuryl, furfurylidene, glutaryl, glycinamido, glycolyl, glycyl, glyocylyl, heptadecanoyl, heptanolyl, hydroperoxy, hydroxamino, hydroxylamido, hydrazido/hydrazide, hydroxy, iodoso, isoccyanato, isonitroso, keto, lactyl, methacrylyl, malonyl, nitroamino, nitro, nitrosamino, nitrosimino, nitrosyllnitroso, nitrilo, oxamido, peroxy, phosphinyl, phosphide/phosphido, phosphite/phosphito, phospho, phosphono, phosphoryl, seleninyl, selenonyl, siloxy, succinamyl, sulfamino, sulfamyl, sulfeno, thiocarboxy, toluoyl, ureido, valeryl radicals, acetimido, amidino, amido, amino, aniline, anilino, arsino, azido, azino, azo, azoxy, benzylidine, benzidyne, biphenyl), butylene, iso-butylene, sec-butylene, tert-butylene, cyano, cyanamido, diazo, diazoamino, ethylene, disilanyl, glycidyl, guanidino, guanyl, heptanamido, hydrazino, hydrazo, hypophosphito, imido, isobutylidene, isopropylidene, silyl, silylene, methylene, mercapto, methylene, ethylene, naphthal, napthobenzyl, naphthyl, naphthylidene, propylene, propylidene, pryidyl, pyrryl, phenethyl, phenylene, pyridino, sulfonyl, sulfo, sulfonyl, tetramethylene, thenyl, thienyl, thiobenzyl, thiocarbamyl, thiocarbonyl, thiocyanato, thionyl, thiuram, toluidino, tolyl, a-tolyl, tolylene, a-tolylene, tosyl, triazano, ethenyl (vinyl), selenyl, trihydrocarbylamino, trihaloamino, trihydrocarbyl phosphite, trihalophosphine, trimethylene, trityl, vinylidene, xenyl, xylidino, xylyl, xylylene, dienes, and combinations thereof.

Preferred examples include urea and urea analogs including thiourea, methyl urea, methyl formamide, methyl acetamide, formamide, and/or combinations thereof.

The instant salt inhibitor may further be used in combination with other salt inhibitors. Examples of such other salt inhibitors include salts of bromine; salts of alkali metals including phosphates, chlorates, bromates, iodates, ferrocyanides, chlorides and the like; and organic compounds including crown ethers, dicarboxylic acids, tetracarboxylic acids, diphosphoric acids, diphosphonic acids, polyphosphoric acids, phosphates, formamides and the like; and combinations including one or more of the foregoing. Specific compounds found useful include potassium bromate, potassium ferrocyanide, ethylene diamine tetra-acetic acid (EDTA), phosphoric acid, malonic acid, malic acid, potassium iodate, adenosine triphosphate (ATP), adenosine diphosphate (ADP), 5-amino-2,4,6-trioxo-1,3-perhydrodizine-N,N-diacetic acid (uramil-N,N-diacetic acid), polyphosphoric acid (poly PA), 1-hydroxyethlidene-1,1-diphosphonic acid (HEDP), diethylene triamine penta(methylene phosphonic acid) (DTPMP), amino tri(methylene phosphonic acid) (ATMP), pyrophosphoric acid (PPA), methylene diphosphoric acid (MDPA), and combinations thereof. Preferred additives include uramil N,N-diacetic acid, HEDP, DTPMP, ATMP, PPA, MDPA, the tri-sodium salt of the phosphonic acid known under the trade name "Dequest 2066A, (available from Solutia, Inc., St. Louis, Mo.) and combinations thereof.

The instant salt inhibitor may be added to the aqueous salt solution (i.e., the brine) at a concentration of less than about 1000 ppm (i.e., less than 0.1 wt %), preferably less than about 900 ppm, preferably less than about 800 ppm, preferably less than about 700 ppm, preferably less than about 600 ppm, preferably less than about 500 ppm, preferably less than about 400 ppm, preferably less than about 300 ppm, preferably less than about 200 ppm, preferably less than about 150 ppm, more preferably less than about 100 ppm, more preferably less than about 90 ppm, more preferably less than about 80 ppm, more preferably less than about 70 ppm, more preferably less than about 60 ppm, more preferably less than about 50 ppm, more preferably less than about 40 ppm, more preferably less than about 30 ppm, more preferably less than about 20 ppm, more preferably less than about 10 ppm, more preferably less than about 5 ppm, with less than about 1 ppm being more preferred.

The instant salt inhibitor may be added to the aqueous salt solution (i.e., the brine) at a concentration of greater than about 0.1 ppm (i.e., greater than 0.00001 wt %), preferably greater than about 0.5 ppm, preferably greater than about 1 ppm, preferably greater than about 2 ppm, preferably greater than about 3 ppm, preferably greater than about 4 ppm, preferably greater than or equal to about 5 ppm.

Without wishing to be bound by theory, the instant salt inhibitor is thought to effect nucleation of the indigenous salt and/or distort the crystal growth of the salt in the aqueous salt solution (e.g., brine), especially when salt may have already started to crystallize and/or i.e., precipitate from the brine, and/or have formed nuclei before contacting the salt inhibitor.

In an embodiment, the aqueous salt solution, e.g., the brine, may be contacted with the salt inhibitor, and then subsequently reinjected back into the reservoir. This embodiment may be especially beneficial in instances wherein the Group 3-15 metal of the salt inhibitor is a naturally occurring component of the brine.

Reduction of Salt Precipitation Tendency

In addition to inhibiting salt precipitation, components designed to purposely cause precipitation of the salt, and/or of salt components may be added to the brine once recovered. The salt contained in the brine is then removed, and the treated brine, now with a reduced salt concentration may be reinjected back into the well or reservoir to reduce the salinity of the connate brine.

In an embodiment, precipitation agents are contacted with essentially saturated brines to produce a treated brine, wherein the precipitation agent encourages dissolved salt in the brine to drop out of solution. The precipitated salt is then removed before the treated brine is re-injected into the reservoir. In an embodiment, the treated brines may be held in a tank or other suitable structure on the surface, where they are encouraged to precipitate out dissolved salt before the brines are reinjected into the reservoir to maintain reservoir pressure. The pH of the solution may be adjusted, either prior to, during, and/or after contacting with the precipitation agent to further encourage precipitation of the salt from the brine. The pH may be lowered, (i.e., the solution acidified), the pH may be raised (i.e., the addition of a base), and/or buffered to a particular pH range to facilitate precipitation of the salt from the treated brine. Accordingly, the treated brine now has the advantage of being under-saturated with respect to dissolved salt, so that the brine has a lessened and/or essentially absent potential to precipitate salt itself. Upon reinjection of the treated brine back into the reservoir, the treated brine can lower the potential for precipitation of connate brines upon contact of the treated brine with connate waters and/or other aqueous salt solutions. In an embodiment, the precipitated salt and/or other material may be recovered, and the precipitation agent regenerated for subsequent use.

Examples of suitable precipitation agents include both organic and inorganic materials, which combine with cations, anions, and/or both of the salts to produce compounds that are insoluble in the treated brine solution. Examples of precipitation agents include $C_2$-$C_{20}$ di-acids, tri-acids, salts thereof, and/or the like, such as oxalic acid and/or citric acid. For example, oxalic acid, when contacted with an acidified brine comprising sodium chloride, results in the precipitation of sparingly soluble sodium oxalate salts. These salts settle and may be removed by filtration, settling, and/or the like. The filtrate (i.e., the treated brine) may then be re-injected back into the reservoir whilst the oxalic acid salt can be recovered by further chemical processing.

The sodium hydrogen oxalate can react with more sodium chloride to form sodium oxalate.

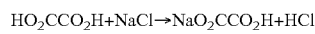

The solubility of these oxalate salts is limited at low temperature particularly in high salinity brine and the presence of hydrochloric acid, which decreases the solubility of sodium chloride in solution.

In another embodiment, various metal salts may be added to the recovered brine to form both an insoluble precipitate, and a soluble material. For example, lead nitrate may be added to the brine, with or without pH adjustment, to form an insoluble material e.g., lead chloride, and the very water soluble material, e.g., sodium nitrate (92.1 g soluble in 100 mls at 0° C. and 180 g soluble in 100 mls at 100° C., which may be compared to NaCl which has a solubility of only 35.7 g at 0° C. and 39.12 g of NaCl at 100° C.). The lead chloride may be isolated and the solution treated to recover the nitrate for re-use.

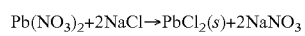

The formation of crystalline salt from aqueous solutions is thought to require a salt in solution, followed by supersaturation of the salt in the solution, followed by nucleation of the salt, which results in crystal growth. Supersaturation is a major driving force for nucleation to occur, and it is one of the most important requirements for crystallization to occur. A solubility/supersolubility plot of concentration of a solute verse temperature comprises three zones; 1) a stable zone of undersaturated solution, here no nucleation or crystal growth is possible and existing crystals dissolve; 2) the supersaturated metastable zone where growth can occur but spontaneous nucleation does not; and 3) the labile supersaturated zone of spontaneous and rapid nucleation, wherein precipitation of the salt from the solution occurs.

The formation of a supersaturated solution is necessary for crystallization to occur. Supersaturation of a salt solution can occur through cooling of the saturated solution, concentrating the saturated solution by evaporation of solvent, and/or a combination thereof.

The primary nucleation is the first stage in the crystallization process where a new crystal is born. The process is believed to be initiated in a series of bimolecular collisions that form an aggregate of embryonic molecular clusters. There is a critical cluster size below which the embryo is unstable and may disintegrate, above the critical size, the cluster becomes a stable nucleus that grows to form a crystal.

Once an ordered structure is formed by nucleation, the growth units diffuse from the supersaturated solution to the surface of the nuclei and incorporate into the lattice resulting in crystal growth. The adsorption of the crystal element on the surface structure of the growing crystal may occur at three possible sites:

ledge sites, wherein a flat surface has only one site of intermolecular interaction available;

step sites, wherein a surface has two sites of possible interaction; and kink sites, wherein three or more possible intermolecular sites are present.

Crystal forming elements with the highest co-ordination number are bound most strongly to the surface, incorporation at a "kink site" is the most energetically favorable. Furthermore, incorporation at a kink site provides a new kink site such that the formation of the crystal becomes a process of repeatable steps. The crystal growth can follow two possible mechanisms known as spiral growth at screw dislocations, or a two-dimensional nucleation.

In two dimensional growth, a monolayer island nucleus called a two-dimensional nucleus must form before growth can occur. This island becomes the source of new steps and kink sites at which additional units can join the surface. The preferred kink site step growth advances until a plane is completed and a new island has to form for further growth to occur. This two dimensional growth only occurs at relatively higher super saturations since it is difficult to generate a nucleus on an already flat crystal surface.

Screw dislocations are characterized by low super saturation growth, and occur along screw dislocations. This model is based on a defect in the structure of the crystal lattice formed by the stress inside the crystal lattice which produces spiraling mounds. These steps of monomolecular height provide energetically favorable positions for further deposition like in the kink sites of the two dimensional model. The screw dislocations are a continuous source of new steps providing a mechanism for uninterrupted growth and a lower degree of super saturation required than for the two-dimensional model.

The crystal habit, also referred to as the morphology of the crystal, is a characterization of the shape of a crystal, which is governed by the different rates of growth of the various crystal faces. Crystals such as halite grow nearly uniformly in all three dimensions and thus will become cubic. The introduction of chemical impurities can have a profound effect on growth rate of one or more of the faces even at very low concentrations. Connate waters may include such impurities, which may be provided in the formation as a complex mixture of many different anions and cations, and may include trace amounts of heavy metals and/or organic compounds from crude oil that have some water solubility. It would be beneficial if a particular brine could be tested to determine the ideal concentration of crystal inhibitors to be added to the brine to prevent precipitation of the salts from the aqueous salt solutions.

In an embodiment, salt inhibitors are deliberately added to the aqueous salt solution (e.g., a brine) to produce a desired morphological change. By absorbing on specific faces, these inhibitors can retard and eventually even stop growth of crystals from an aqueous salt solution.

Preparing the wellbore region with a pre-flush treatment may result in enhanced adsorption of the salt inhibitor to the wellbore region. It is believed that the adsorption is enhanced by modifying the surface charges of the wellbore region, such that there is more favorable interaction between the salt inhibitor and the wellbore region. As used herein, "preconditioning the wellbore region," means treating the wellbore region with a pre-flush treatment, such that the surface charges of the wellbore region are modified. Preconditioning the wellbore region can be achieved by pre-flushing acidic or alkaline aqueous solutions into the wellbore region. A pre-flush solution may be injected into the wellbore region prior to injecting the salt inhibitor.

In applications where preconditioning the wellbore region occurs by pre-flushing the wellbore region with an acidic aqueous solution, the acidic aqueous solution may be comprised of acidic aqueous salt solution(s). In an embodiment, the acidic aqueous solution is 5-20% by volume hydrochloric acid in an ammonium chloride solution. Alternatively, preconditioning of the wellbore region may occur by pre-flushing the wellbore region with alkaline aqueous solutions. When the preconditioning occurs by pre-flushing with an alkaline aqueous solution, the alkaline aqueous solution may be comprised of alkaline aqueous salt solution(s). In an embodiment, the alkaline aqueous solution is 5-50% by volume ammonium hydroxide in an ammonium chloride solution.

The preconditioning of the wellbore may be optimized by shutting in the pre-flush solution for a period of time prior to emplacing the salt inhibitor into the wellbore region. In some embodiments, the pre-flush solution may be shut in to the wellbore region from about 0.1 hours to about 10.0 hours. In other embodiments, the pre-flush solution may be shut in to the wellbore region from about 0.5 hours to about 4.0 hours.

Following the preconditioning treatment, the salt inhibitor may be emplaced into the wellbore region and shut in for a period of time. One of skill in the art may appreciate that the shut in time will vary depending upon the particular application. In some embodiments, the salt inhibitor is shut in for a period of time sufficient to initiate adsorption of the salt inhibitor onto the wellbore region. More particularly, the period of time for shutting in the salt inhibitor is in the range of about 0.5 hours to about 20 hours.

In some embodiments, the salt inhibitors include urea and urea analogues of the following formulae:

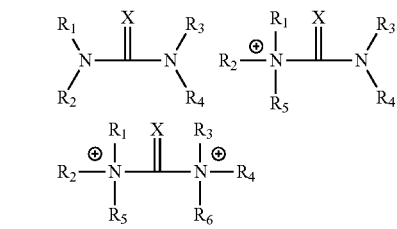

and mixtures of these, wherein X is selected from the group consisting of oxygen and sulfur, and $R_1$, $R_2$, $R_3$, $R_4$, and when present, $R_5$ and/or $R_6$ each independently comprise a functional group selected from the group consisting of: hydrogen, an alkyl chain comprising 1 to 20 carbon atoms, oxygen, sulfur, phosphorous, silicon, selenium, and combinations thereof. In some embodiments, the concentration of the salt inhibitor is in the range of about 5% to about 20% by volume, in an ammonium chloride brine.

EXAMPLES

The following examples serve to describe the general method of reducing salt saturation in produced waters, thereby enhancing the salt inhibition post squeeze treatment.

Table 1 is a tabulated representation of the amount of static adsorption of salt inhibitor onto sandstone surfaces under reservoir condition at different pH values.

TABLE 1

| Solution PH | Concentration (ppm) At t = 0 hour | Concentration (ppm) At t = 24 hour | Amount of Adsorption (mg/g rock) |
|---|---|---|---|
| 2 | 2108 | 1650 | 2.325 |
| 3.5 | 2114 | 1731 | 1.925 |
| 6 | 2148 | 1832 | 1.568 |
| 9 | 2128 | 1764 | 1.824 |

The concentration of the active component (in ppm) were measured at the start (time=0 hour) and at the end (time=24 hours) of the static adsorption experiment. The amount of adsorption (in mg per g of rock) on sandstone surfaces was calculated for each test. Under the four solution pH conditions tested, results show that the amount of adsorption is lowest at the pH condition close to neutral (pH=6), and higher adsorption values were observed at both acidic and alkaline conditions. The amount of adsorption is highest at pH=2 with a value of 2.325 mg per g of rock.

Table 2 is a tabulated representation of the amount of static adsorption of salt inhibitor onto sandstone surfaces under reservoir condition using and acidic pre-treatment technique.

TABLE 2

| Test | Concentration (ppm) At t = 0 hour | Concentration (ppm) At t = 24 hour | Amount of Adsorption (mg/g rock) |
|---|---|---|---|
| Control test (without pre-treatment step) | 1098 | 976 | 0.533 |
| Test using acidic pre-treatment | 1024 | 579 | 2.256 |
| Repeat test using acidic pre-treatment | 1024 | 613 | 2.133 |

The concentration of the active component (in ppm) was measured at the start (time=0 hour) and at the end (time=24 hours) of the static adsorption experiment. The amount of adsorption (in mg per g of rock) on sandstone surfaces was calculated for each test. Under the very same testing conditions, the control test (test without a acidic pre-treatment stage) shows the lowest adsorption value (0.533 mg per g of rock), while duplicated tests using an acidic pre-treatment technique show much higher amount of adsorption than that of the control test.

Table 3 is a tabulated representation of the amount of static adsorption of salt inhibitor onto sandstone surfaces under reservoir condition using alkaline pre-treatment technique.

TABLE 3

| Test | Concentration (ppm) At t = 0 hour | Concentration (ppm) At t = 24 hour | Amount of Adsorption (mg/g rock) |
|---|---|---|---|
| Control test (without pre-treatment step) | 1098 | 976 | 0.533 |
| Test using alkaline pre-treatment | 1024 | 741 | 1.392 |
| Repeat test using alkaline pre-treatment | 1024 | 761 | 1.344 |

The concentration of the active component (in ppm) was measured at the start (time=0 hour) and at the end (time=24 hours) of the static adsorption experiment. The amount of adsorption (in mg per g of rock) on sandstone surfaces was calculated for each test. Under the very same testing conditions, the control test (test without an alkaline pre-treatment stage) shows the lowest adsorption value (0.533 mg per g of rock), while duplicated tests using an alkaline pre-treatment technique show higher amount of adsorption than that of the control test.

Referring now to the Figures, FIG. 1 is a graphical representation of salt inhibitor return profiles from laboratory core flood using acidic pre-flushed squeeze package. The concentration of the active component (in ppm) in the core flood post flush samples were measured and plotted against the pore volume following the core flood using a squeeze package containing an acidic pre-treatment stage. Result shows that, for over 1200 pore volumes of post flush, the concentration of the active inhibiting component in the effluent samples still remains above 50 ppm. This value is well above the field MIC. This core flood result indicates an excellent squeeze life by using this squeeze package.

Figure 2:
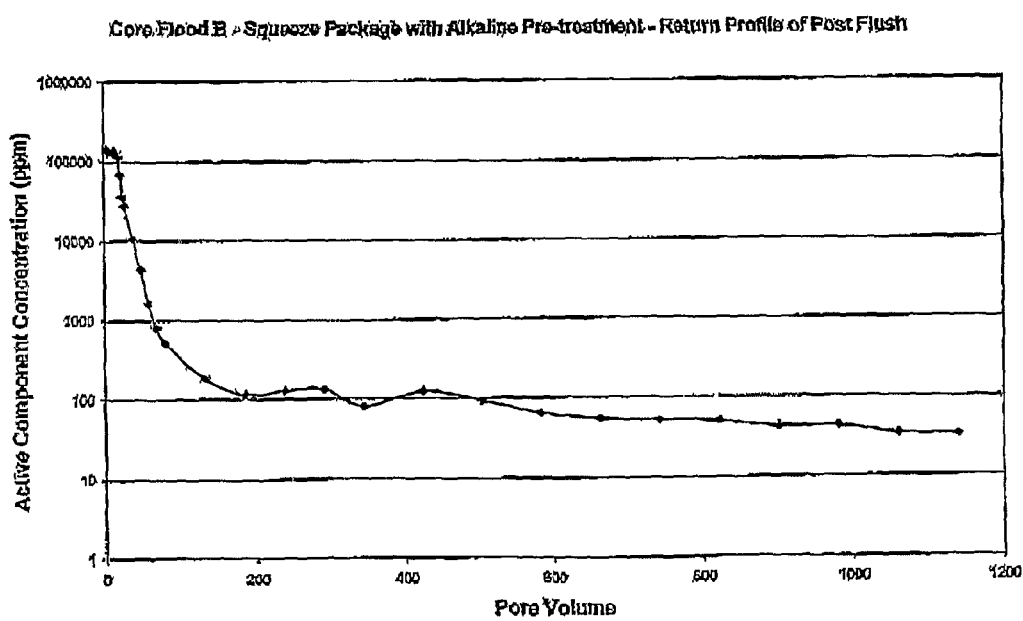
FIG. 2 is a graphical representation of salt inhibitor return profiles from laboratory core flood using alkaline pre-flushed squeeze package.

FIG. 2 is a graphical representation of salt inhibitor return profiles from laboratory core flood using alkaline pre-flushed squeeze package. The concentration of the active component (in ppm) in the core flood post flush samples were measured and plotted against the pore volume following the core flood using a squeeze package containing an alkaline pre-treatment stage. Result shows that, for over 1139 pore volumes of post flush, the concentration of the active inhibiting component in the effluent samples still remains above 33 ppm, which is also above the field MIC. This core flood result indicates an excellent squeeze life by using this squeeze package.

It should be understood, of course, that the foregoing relates to preferred embodiments of the invention and that modifications may be made without departing from the spirit and scope of the invention as set forth in the following claims.

What is claimed:

1. A method of enhancing the adsorption of a salt inhibitor onto a wellbore region, the method comprising:
preconditioning the wellbore region;
emplacing the salt inhibitor into the wellbore region, wherein the salt inhibitor is selected from:

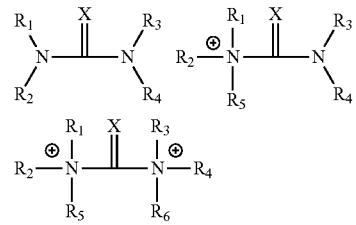

and mixtures of these
wherein X is selected from the group consisting of oxygen and sulfur, and
$R_1$, $R_2$, $R_3$, $R_4$, and when present, $R_5$ and/or $R_6$ each independently comprise a functional group selected from the group consisting of:
hydrogen, an alkyl chain comprising 1 to 20 carbon atoms, oxygen,
sulfur, phosphorous, silicon, selenium, and combinations thereof; and
shutting in the well for a period of time sufficient to at least initiate adsorption of the salt inhibitor onto the wellbore region.

2. The method of claim 1, further comprising:
preconditioning the wellbore region with an acidic solution.

3. The method of claim 2, wherein the acidic solution is a 5-20% by volume hydrochloric acid in a chloride brine.

4. The method of claim 1, further comprising:
preconditioning the wellbore region with an alkaline solution.

5. The method of claim 4, wherein the alkaline solution is a 5-50% by volume ammonium hydroxide solution in a chloride brine.

6. The method of claim 1, further comprising:
shutting in the wellbore region after the preconditioning step for a period of time sufficient to initiate the preconditioning of the wellbore region.

7. The method of claim 6, wherein the preconditioning shut in period of time is in the range of about 0.5 hours to about 4.0 hours.

8. The method of claim 1, wherein the adsorption shut in period of time is in the range of about 0.5 hours to about 12.0 hours.

9. The method of claim 1, further comprising:
flowing a production of the well back to the surface; and
monitoring a salt inhibitor residue from the well.

* * * * *